US005686713A

United States Patent [19]

Rivera

[11] Patent Number: 5,686,713

[45] Date of Patent: Nov. 11, 1997

[54] APPARATUS AND METHOD FOR ALLOWING A MONEY ORDER PURCHASE VIA AN ATM

[76] Inventor: Antonio Rivera, 221 Dartmouth St., Hempstead, N.Y. 11550

[21] Appl. No.: 604,768

[22] Filed: Feb. 22, 1996

[51] Int. Cl.$^6$ .......... G06K 5/00

[52] U.S. Cl. .......... 235/380; 235/379; 235/381; 902/10

[58] Field of Search .......... 235/379, 380, 235/381; 902/10

[56] References Cited

U.S. PATENT DOCUMENTS 4,630,201 12/1986 White .......... 235/380
4,677,565 6/1987 Ogaki et al. .......... 235/381
4,988,849 1/1991 Sasaki et al. .......... 902/10
5,477,037 12/1995 Berger .......... 235/379

*Primary Examiner*—Harold Pitts

[57] ABSTRACT

An apparatus and method for allowing a money order purchase via an ATM including a money acceptor and dispenser for receiving and generating money, respectively. Also included is an ATM card reader for receiving a card with a magnetic strip having an account number stored thereon wherein the reader is further adapted to retrieve the account number therefrom. A control mechanism operates in combination with a plurality of function keys to allow a user to withdraw cash, deposit cash, and purchase a money order by means of an ATM.

1 Claim, 3 Drawing Sheets

APPARATUS AND METHOD FOR ALLOWING A MONEY ORDER PURCHASE VIA AN ATM

BACKGROUND OF THE INVENTION

1. Field of the Invention

The present invention relates to an apparatus and method for allowing a deposit, withdraw, and money order purchase via an ATM and more particularly pertains to integrating the ability to purchase money orders and deposit monies in an automatic teller machine.

2. Description of the Prior Art

The use of automatic teller machines is known in the prior art. More specifically, automatic teller machines heretofore devised and utilized for the purpose of allowing automated withdrawal of monies are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,021,967 to Smith an apparatus for dispensing money orders, wherein the money order dispenser includes a digital processor for controlling the overall operation thereof, a keyboard for entering transaction data to request the printing of a money order. U.S. Pat. No. 4,442,346 to Bosinger et al. discloses a money deposit and/or dispensing device having a plurality of bank note reception compartments or cases mounted on a moveable support rotatably mounted in a safe-type housing. U.S. Pat. No. 4,567,358 to Takamatsu et al. discloses an automatic teller system. U.S. Pat. No. 4,365,700 to Arimoto et al.; U.S. Pat. No. 4,282,892 to Burnside; and U.S. Pat. No. 3,954,260 to Morello et al. are provided as being of general interest.

In this respect, the apparatus and method for allowing a deposit, withdraw, and money order purchase via an ATM according to the present invention substantially departs from the conventional concepts and designs of the prior art, and in so doing provides an apparatus primarily developed for the purpose of integrating the ability to purchase money orders and deposit monies in an automatic teller machine.

Therefore, it can be appreciated that there exists a continuing need for a new and improved apparatus and method for allowing a deposit, withdraw, and money order purchase via an ATM that can be used for integrating the ability to purchase money orders and deposit monies in an automatic teller machine. In this regard, the present invention substantially fulfills this need.

SUMMARY OF THE INVENTION

In view of the foregoing disadvantages inherent in the known types of automatic teller machines now present in the prior art, the present invention provides an improved apparatus and method for allowing a deposit, withdraw, and money order purchase via an ATM. As such, the general purpose of the present invention, which will be described subsequently in greater detail, is to provide a new and improved apparatus and method for allowing a deposit, withdraw, and money order purchase via an ATM which has all the advantages of the prior art and none of the disadvantages.

To attain this, the present invention essentially comprises a housing unit having an interaction face disposed thereon. An ATM card reader is situated on the interaction face of the housing unit. The ATM card reader is adapted to receive a card with a magnetic strip having an account number stored thereon. The reader is further adapted to retrieve the account number therefrom. A display is situated on the interaction face of the housing unit. Also included is a paper money and coin acceptor situated on the interaction face of the housing unit for accepting and accounting for paper money and coin. A money order printer is situated within the housing and is adapted to print a money order on one of a plurality of money orders present on a continuous strip. A paper money and coin dispenser is situated on the interaction face of the housing unit for dispensing paper money and coin therefrom. A receipt printer is situated within the housing for generating a receipt representing a transaction. Finally, a control mechanism is connected to the ATM card reader, paper money and coin acceptor, display, money order printer, receipt printer, and paper money and coin dispenser. The control mechanism is adapted to allow the withdrawal of paper money and coin from an account by a user, to allow the deposit of paper money and coin into an account by a user, and to generate a money order in exchange for paper money and coin.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus and method for allowing a deposit, withdraw, and money order purchase via an ATM which has all the advantages of the prior art automatic teller machines and none of the disadvantages.

It is another object of the present invention to provide a new and improved apparatus and method for allowing a deposit, withdraw, and money order purchase via an ATM which may be easily and efficiently manufactured and marketed.

It is a further object of the present invention to provide a new and improved apparatus and method for allowing a deposit, withdraw, and money order purchase via an ATM which is of a durable and reliable construction.

An even further object of the present invention is to provide a new and improved apparatus and method for allowing a deposit, withdraw, and money order purchase via an ATM which is susceptible of a low cost of manufacture with regard to both materials and labor, and which accordingly is then susceptible of low prices of sale to the consuming public, thereby making such apparatus and method for allowing a deposit, withdraw, and money order purchase via an ATM economically available to the buying public.

Still yet another object of the present invention is to provide a new and improved apparatus and method for allowing a deposit, withdraw, and money order purchase via an ATM which provides in the apparatuses and methods of the prior art some of the advantages thereof, while simultaneously overcoming some of the disadvantages normally associated therewith.

Still another object of the present invention is to integrate the ability to purchase money orders and deposit monies in an automatic teller machine.

Lastly, it is an object of the present invention to provide a new and improved apparatus and method for allowing a money order purchase via an ATM including a money acceptor and dispenser for receiving and generating money, respectively. Also included is an ATM card reader for receiving a card with a magnetic strip having an account number stored thereon wherein the reader is further adapted to retrieve the account number therefrom. A control mechanism operates in combination with a plurality of function keys to allow a user to withdraw cash, deposit cash, and purchase a money order by means of an ATM.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
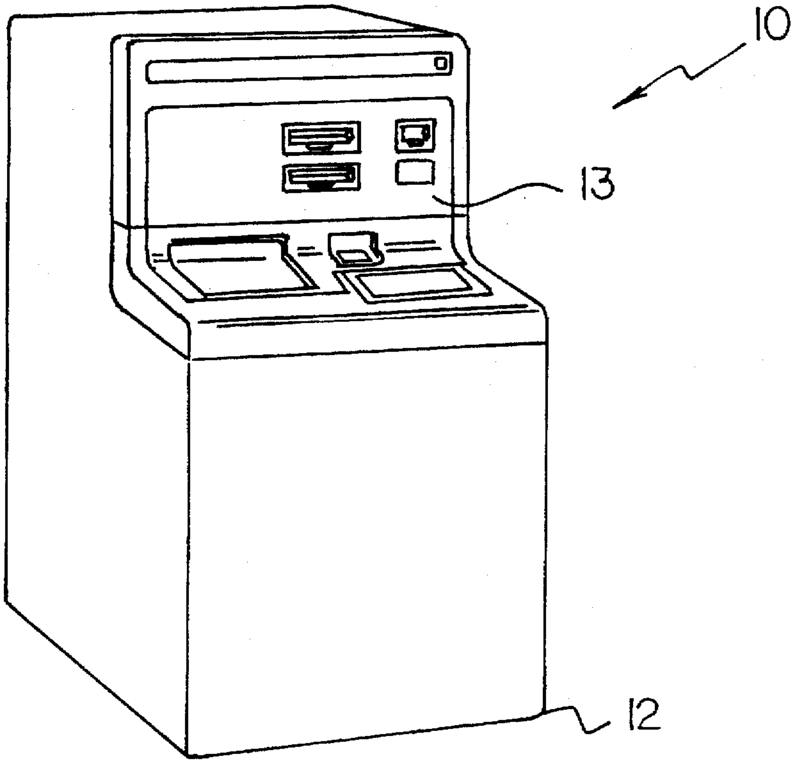
FIG. 1 is a perspective illustration of the preferred embodiment of the apparatus and method for allowing a deposit, withdraw, and money order purchase via an ATM constructed in accordance with the principles of the present invention.
Figure 2:
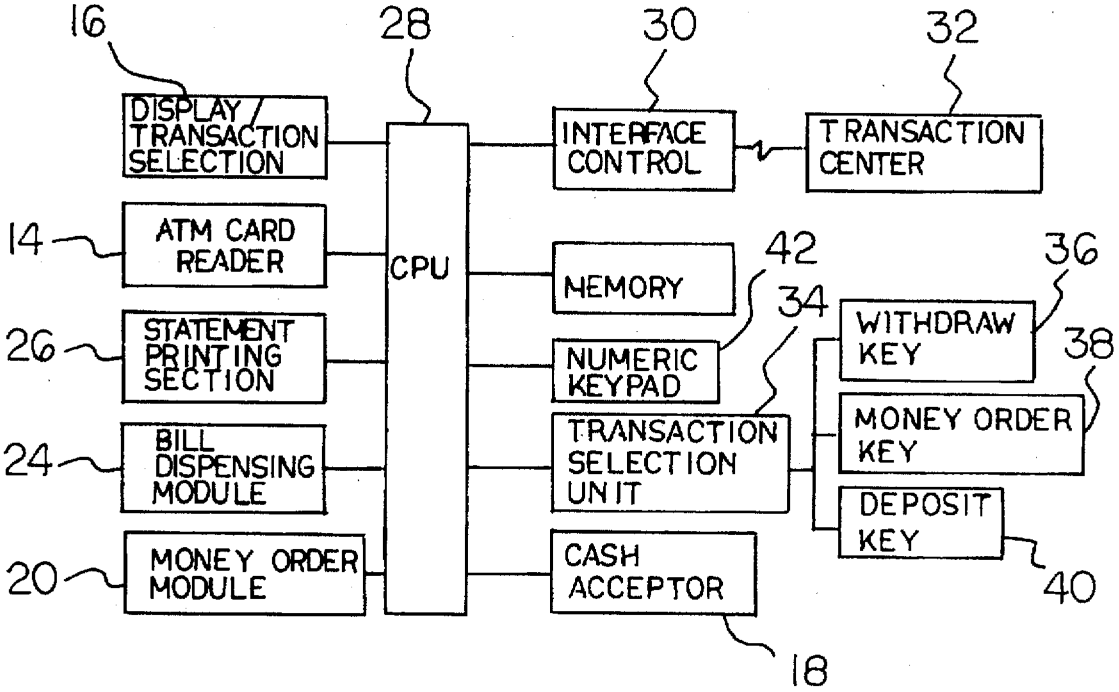
FIG. 2 is a schematic depicting the interconnection of components employed in the present invention.
Figure 3:
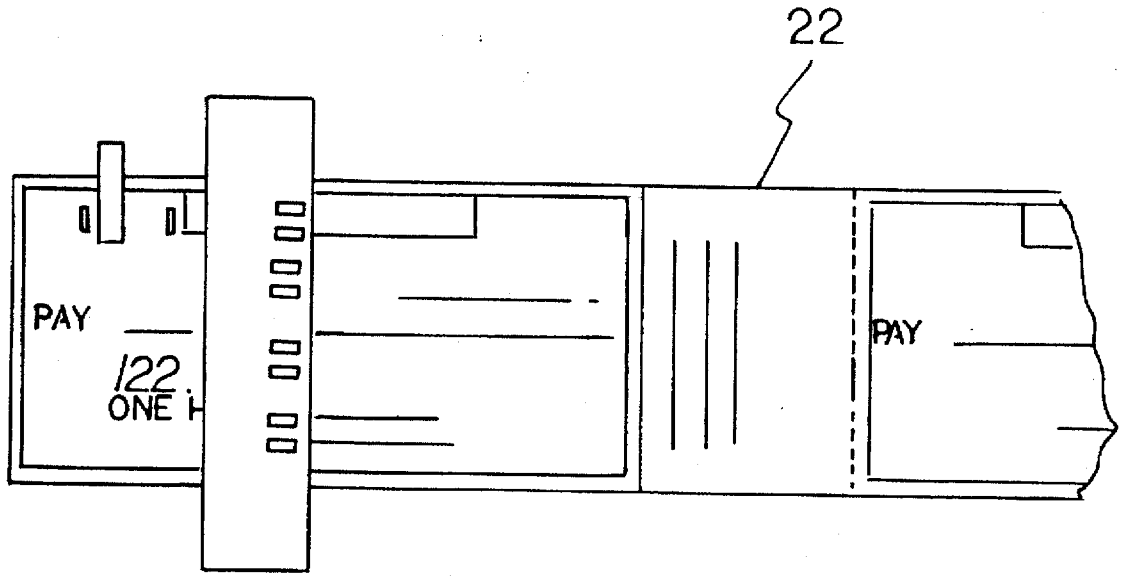
FIG. 3 is a plan front view of the continuous strip of money orders.

With reference now to the drawings, and in particular to FIGS. 1 through 4 thereof, a new and improved apparatus and method for allowing a deposit, withdraw, and money order purchase via an ATM embodying the principles and concepts of the present invention and generally designated by the reference numeral 10 will be described.

The present invention, the new and improved apparatus and method for allowing a deposit, withdraw, and money order purchase via an ATM, is comprised of a plurality of components. Such components in their broadest context include a housing, ATM card reader, display, paper money and coin acceptor, money order printer, receipt printer, and control mechanism. Such components are individually configured and correlated with respect to each other so as to attain the desired objective.

More specifically, it will be noted that the system 10 of the present invention comprises a housing unit 12 having an interaction face 13 disposed thereon. In an alternate embodiment the rectangular housing may consist of a self-standing unit with an interaction face disposed on each of the four faces thereof.

An ATM card reader 14 is situated on the interaction face of the housing unit. The ATM card reader is adapted to receive a card with a magnetic strip having an account number stored thereon. The reader is further adapted to retrieve the account number therefrom. Such ATM card readers and associated cards are commonly known in the present art.

A display 16 is situated on the interaction face of the housing unit. Such display is utilized for prompting a user to respond to an instruction or enter necessary information.

A paper money and coin acceptor 18 is situated on the interaction face of the housing unit for accepting and accounting for paper money and coin. Such a device is capable of detecting counterfeit bills and rejects them upon the detection thereof. Also, the acceptor is able to accept and differentiate between all denominations of paper money and coin.

Situated within the housing is a money order printer 20 adapted to print a money order on one of a plurality of money orders present on a continuous strip 22. The continuous strip may be perforated between each contingent money order for easy separation. By configuring the money orders in a continuous strip, the automation of the present invention is simplified and less susceptible to failure.

A paper money and coin dispenser 24 is situated on the interaction face of the housing unit for dispensing paper money and coin therefrom. The dispenser is capable of generating all denominations of paper money and coin. Such dispensers are commonly found in conventional ATM machines and convenience machines.

A receipt printer 26 is situated within the housing for generating a receipt that represents a present transaction. The receipt printer is adapted to print a different receipt depending on the type of transaction undergone.

Finally, a control mechanism 28 is connected to the ATM card reader, paper money and coin acceptor, display, money order printer, receipt printer, and paper money and coin dispenser. The control mechanism is adapted to allow the withdrawal of paper money and coin from an account by the user, to allow the deposit of paper money and coin into an account by the user, and to generate a money order in exchange for paper money and coin. For each transaction, an interface control mechanism 30 is employed for communicating to a transaction center 32 a record of the transaction. Such a record may consist of an updated account balance in the case of a withdrawal or deposit. Finally, conventional memory is employed to facilitate the operation thereof.

For allowing the control mechanism to distinguish which operation to perform, a transaction selection unit 34 is situated on the interaction face of the housing unit. The transaction selection unit comprises a withdraw key 36 for withdrawing paper money and coin from a designated account and a money order key 38 for obtaining a money order. Additionally, a deposit key 40 may be included for depositing paper money and coin into a designated account.

Figure 4:
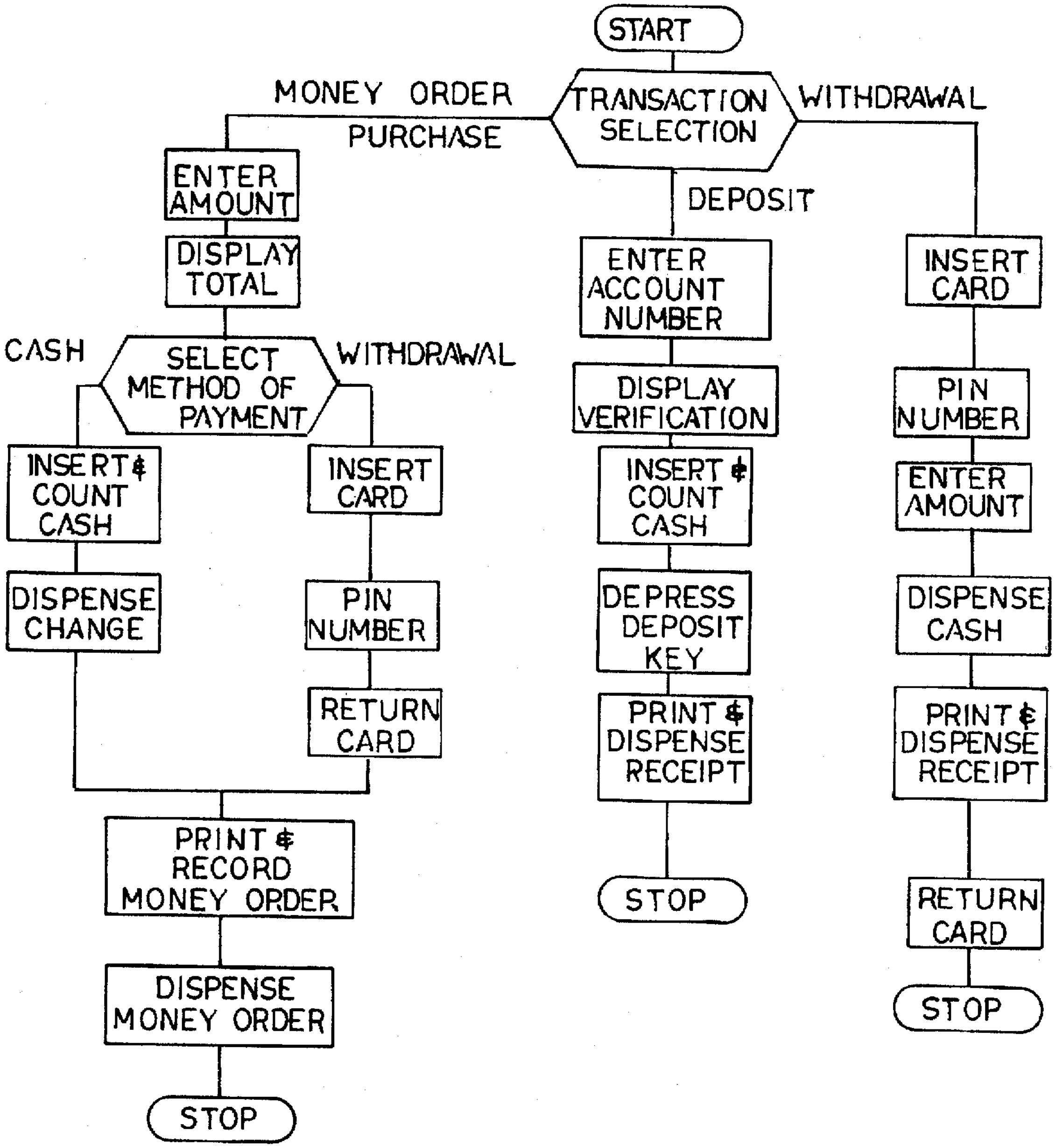
FIG. 4 is a flow chart depicting the method utilized in the present invention.

The method of transaction, as best shown in the flow chart of FIG. 4, will now be described. First, the display prompts the user to choose one of the three types of transactions by depressing one of the selection keys. Upon the depression of the withdrawal key, the display instructs the user to insert the card with a magnetic strip thereon into the magnetic card reader. The account number is then extracted via the magnetic card reader and the display prompts the user to enter a personal identification number (PIN) and an amount of cash to be withdrawn. After both the PIN and amount of withdrawal is entered, the appropriate paper money and coin are dispensed from the paper money and coin dispenser. The receipt printer then generates a receipt depicting the amount of withdrawal and current balance. Finally, the card is returned by the ATM card reader.

Upon the depression of the deposit key, the display prompts the user to enter an account number in a keypad 42. This may also be accomplished by inserting the ATM card within the card reader. A verification message depicting the name of the account owner is then displayed. The display subsequently prompts the user to enter cash into the paper money and coin acceptor and depress the deposit key thereafter. Once the money has been entered and accounted for, the account is updated to reflect the new balance. Lastly, the receipt printer prints a receipt reflecting the account number, new balance, and amount of the deposit.

If the money order key is pressed, the user is prompted to enter via the keypad the requested amount of money order. The display then depicts the total money required including the appropriate fee. The display then prompts the user to enter a method of payment consisting of a withdrawal or cash. If cash is the choice of payment, the paper money and coin acceptor is employed in a manner similar to that of the deposit. The user continues to insert money until the required sum is matched. If an excess amount of money is entered, the paper money and coin dispenser is adapted to generate appropriate change. Once the money is accounted for, a money order is printed by the money order printer and made available to the user. On the other hand, if a withdrawal is the choice of payment, a method similar to that associated with a withdrawal is employed except the money is delivered in the form of a money order and the fee is automatically removed from the account of the user. If the account of the user fails to contain the required amount of the transaction, the user is requested to employ a cash payment. Both methods of payment may be used in any combination thus affording optimal convenience to the user.

The present invention offers a unique apparatus and associated method for allowing a user to withdraw money, deposit money, and purchase a money order. With the unique use of a paper money and coin acceptor, the user may both deposit money into an account and pay cash for a money order. It should be noted that the foregoing apparatus and method may also be employed in the dispensing of cashier checks, traveler checks, and the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved method for allowing a deposit, withdraw, and money order purchase via an automatic teller machine comprising the steps of:

providing a housing unit having an interaction face disposed thereon;

providing an automatic teller machine card reader situated on the interaction face of the housing unit, the automatic teller machine card reader adapted to receive a card with a magnetic strip having an account number stored thereon and further adapted to retrieve the account number therefrom;

providing a numeric keypad situated on the interaction face and adapted to allow a user to input a pin number and an amount of money;

providing a display situated on the interaction face of the housing unit for prompting a user to respond to an instruction or enter necessary information;

providing a paper money and coin acceptor situated on the interaction face of the housing unit for accepting and accounting for paper money and coin, the paper money and coin acceptor adapted to differentiate between all denominations of paper money and coin and further reject counterfeit bills;

providing a money order printer situated within the housing and adapted to print a money order on one of a plurality of money orders present on a continuous strip, the strip being perforated between each contiguous money order;

providing a paper money and coin dispenser situated on the interaction face of the housing unit for dispensing paper money and coin therefrom;

providing a receipt printer situated within the housing for generating a unique receipt corresponding to a type of transaction undergone;

providing control means connected to the automatic teller machine card reader, numeric keypad, paper money and coin acceptor, display, money order printer, receipt printer, memory and money dispenser, the control means adapted to generate a money order in exchange for money and further adapted to allow money to be deposited in or withdrawn from a predetermined account;

providing interface control mechanism connected to the control means for communicating with a transaction center a record of the transaction;

providing transaction selection unit situated on the interaction face of the housing unit having plurality of selection keys including a withdraw key for withdrawing money and coin from a designated account, a money order key for obtaining a money order, and a deposit key for depositing money and coin to a designated account;

determining whether the transaction comprises a withdrawal, deposit, or money order purchase with the selection keys;

initiating a plurality of sequenced steps upon the depression of the withdrawn key including the steps of:

accepting a card with a magnetic strip thereon and further retrieving an account number therefrom, prompting a user to input a personal identification number, prompting the user to select an amount of money for withdrawing, dispensing the money, generating a receipt depicting the amount of withdrawal and current balance, and returning the card to the user;

initiating a plurality of sequenced steps upon the depression of the deposit key including the steps of:

accepting a card with a magnetic strip thereon and further retrieving an account number therefrom, displaying on the display the name of the account owner, prompting the user to enter an amount of money into the paper money and coin acceptor, accounting for the money accepted, generating a receipt depicting the amount of deposit, new balance, and account number, and returning the card to the user;

initiating a plurality of sequenced steps upon the depression of the money order key including the steps of:

prompting a user to enter an amount of a requested money order, displaying the money required including a fee, prompting a user to enter a method payment, entering the required money in the paper money and coin acceptor upon the method payment being a deposit and subsequently generating change with the paper money and coin dispenser upon an excess amount of paper money and coin being entered, entering a card with a magnetic strip thereon and further retrieving an account number therefrom upon the method of payment being a withdrawal and subsequently prompting a user to input a personal identification number, prompting the user to select an amount of money for withdrawing, generating a receipt depicting the amount of withdrawal and current balance, prompting the user to enter paper money and coin upon there not being sufficient funds in an account represented by the account number, and returning the card to the user; and dispensing a money order from the money order dispenser upon the receipt of the required money including the fee.

* * * * *